United States Patent [19]

Matsuda

[11] Patent Number: 5,616,914
[45] Date of Patent: *Apr. 1, 1997

[54] IMAGE READING APPARATUS WITH CORRECTION OF IMAGE SIGNALS

[75] Inventor: Shinya Matsuda, Machida, Japan

[73] Assignee: Minolta Co., Ltd., Osaka, Japan

[ * ] Notice: The term of this patent shall not extend beyond the expiration date of Pat. No. 5,416,609.

[21] Appl. No.: 402,918

[22] Filed: Mar. 13, 1995

[30] Foreign Application Priority Data

Mar. 15, 1994 [JP] Japan .................................. 6-043692

[51] Int. Cl.⁶ .................................................... H04N 1/40
[52] U.S. Cl. ..................... 250/208.1; 358/474; 358/471; 358/486; 250/559.06; 250/559.08
[58] Field of Search .......................... 250/208.1, 559.04, 250/559.05, 559.06, 559.07, 559.08, 216, 234, 235; 358/471, 474, 486, 493

[56] References Cited

U.S. PATENT DOCUMENTS

| | | | |
|---|---|---|---|
| 4,980,720 | 12/1990 | Siegel | 355/233 |
| 5,084,611 | 1/1992 | Okisu et al. | |
| 5,184,733 | 2/1993 | Arnarson et al. | 209/585 |
| 5,221,974 | 6/1993 | Kusumoto et al. | |
| 5,362,958 | 11/1994 | Ando | 250/208.1 |
| 5,416,609 | 5/1995 | Matsuda et al. | 358/474 |

*Primary Examiner*—Stephone Allen
*Attorney, Agent, or Firm*—Price, Gess & Ubell

[57] ABSTRACT

An image reading apparatus for reading a document such as book, constructed to detect a height of the document. A line sensor captures an image of the document and a lateral side view of the document reflected on a mirror. Then the height of the document detected by the line sensor is corrected based on a deviation between a positions of the document image projected on the line sensor and the lateral side view of the document projected on the line sensor.

16 Claims, 9 Drawing Sheets

IMAGE READING APPARATUS WITH CORRECTION OF IMAGE SIGNALS

BACKGROUND OF THE INVENTION

1. Field of the Invention

The present invention relates to an image reading apparatus for reading book-like documents from an overhead direction, and more specifically relates to an image reading apparatus which measures the distance to the document surface, and focuses and corrects for image distortion during image reading.

2. Description of the Related Art

An image reading apparatus for reading documents having a spatial curvature such as a book are known which, for example, detect a height of a surface of a document disposed face up on a document table, and scan the document image while focusing based on said detection. The aforesaid image reading apparatus focuses by adjusting the distance between the document surface and a unit by moving said unit in the direction of the optical axis of a lens, said unit comprising a line sensor such as a charge-coupled device (CCD) which accomplishes photoelectric conversion, the lens which forms the document image on said line sensor. As the focusing operation occurs, the document is read simultaneously by a main scanning accomplished by the line sensor in the unit, and a subscanning accomplished by moving the document in a subscanning direction (direction perpendicular to the main scanning direction of the line sensor).

Another image reading apparatus are also known, wherein after the document image data are read by the scans in both the main scanning and subscanning directions via an area reader, the document image data distorted by compression such as the binding area and the like is corrected based on document height detection, i.e., the image distortion correction is accomplished.

In the former image reading apparatus, reading of the document in the subscanning direction must be accomplished on the optical axis of the lens (namely, line sensor must be fixedly positioned on the optical axis prolongation line), which is disadvantageous inasmuch as there is a large amount of movement of the document moving portion during subscanning, such that the apparatus cannot be rendered in compact form.

In the latter image reading apparatus, however, reading of the document in the subscanning direction is possible off the lens optical axis, such that there is not any movement of the document moving portion for subscanning. Since the lens only moves along the optical axis, however, the line sensor (reading portion) reads the image from a position above the lens, such that the off-axial position of the lens causes the document to be read in an inclined direction. When the height of the document changes, reading position of the document and the height data detection position for correcting read image data are different. Furthermore, when the lens alone is moved for focusing, the document reading position is moved at the off-axial position relative to the optical axis, such that focusing and correction of image distortion cannot be accurately corrected during image reading.

SUMMARY OF THE INVENTION

In order to eliminate the previously described disadvantages, according to the present invention, an image reading apparatus for reading an open book document placed face up on a document table by optical scanning comprises: a mirror arranged along a lateral side of the document table in a subscanning direction and which reflects a lateral side view of the book document placed on the document table; a projection lens disposed above the document table and which projects an image of the book document placed on the document table and the lateral side view of the book document reflected on the mirror, wherein said projection lens is movable only along the direction of the optical axis thereof; a scanner disposed above the projection lens which includes a line sensor arranged along a main scanning direction and sequentially moves a reading position of the line sensor in the subscanning direction, wherein the line sensor captures an image of the book document projected by the projection lens and the lateral side view of the book document reflected on the mirror to generate image signal at every reading position; detection means for detecting a height of the book document placed on the document table at every reading position based on the image signal of the lateral side view of the book document; and correction means for correcting the detected height of the book document at every reading position based on a deviation between a position of the image of the book document projected on the line sensor and a position of the lateral side view of the book document projected on the line sensor with respect to the subscanning direction, wherein said deviation is generated from the movement of the projection lens in the direction of the optical axis thereof.

The image reading apparatus of the aforesaid construction determines the height of the document on the reading optical path based on the change in the document reading angle produced by moving the line sensor, and changes the document height data in accordance with the amount of change in the optical path coincident with the lens movement required to focus on the document surface. Thus, focusing on the surface of the entire document can be accomplished by moving the lens based on the aforesaid corrected height data.

Similarly, the amount of correction for document compression can be determined by determining the angle of inclination of the document to the optical path based on the change in the document reading angle produced by moving the line sensor. An image distortion can be electrically corrected using the aforesaid correction amount.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention will be described hereinafter with reference to the accompanying drawings.

Figure 1:
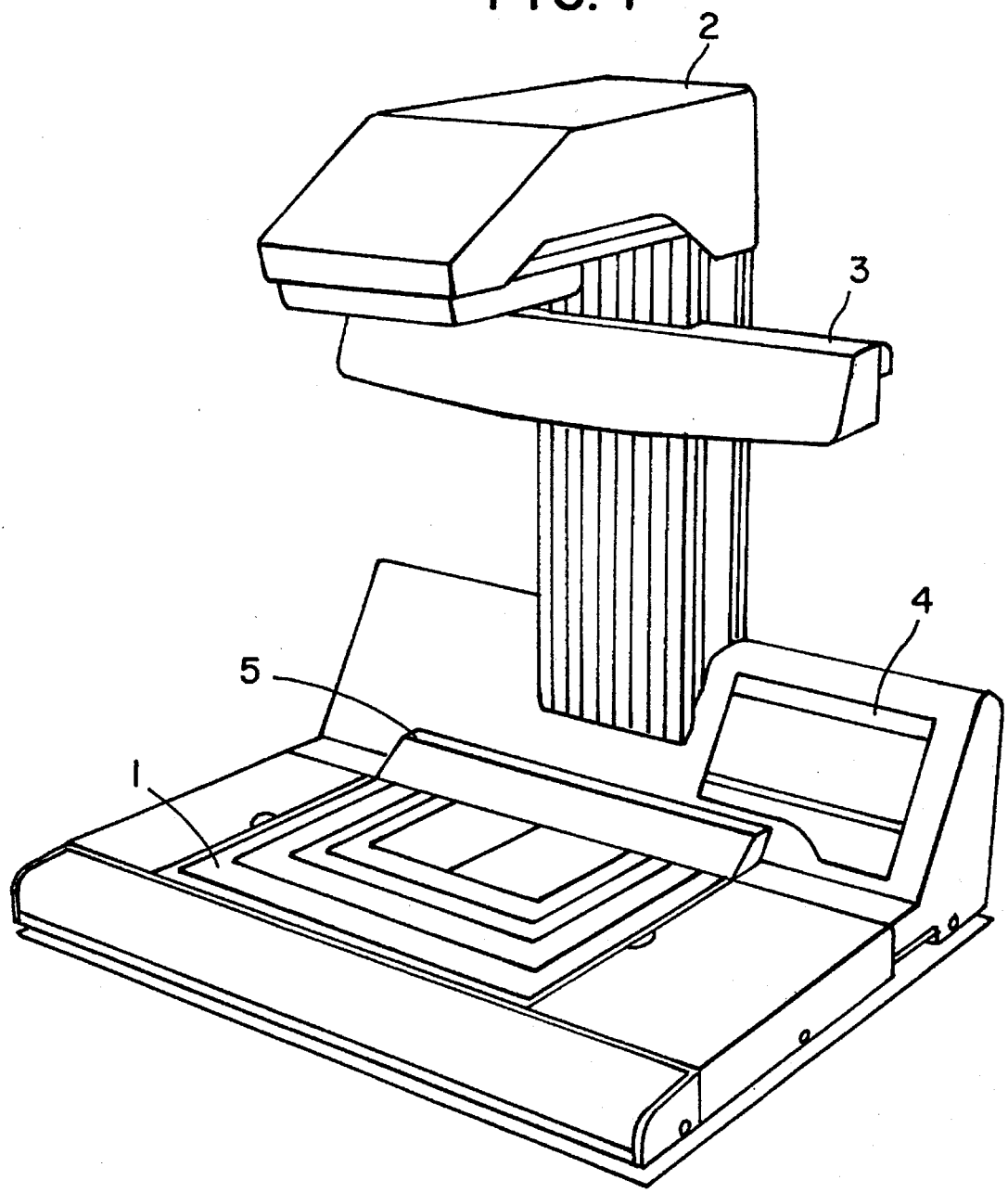
FIG. 1 is a perspective view of the image reading apparatus of the present invention.

FIG. 1 shows the general construction of the image reading apparatus. In FIG. 1, a document is shown such as a book or a file whose sheets of paper are bound at one end, and when being spread out, whose surface is distorted at each page like a column. Then, said document is placed face up on a document table 1 of the image reading apparatus. A reading section 2 for reading the document by main scanning and subscanning is provided at a position above the document table 1 at which said document is readable. An operating area having a predetermined spacing is formed between the document table 1 and the reading section 2. The present apparatus is provided with an illumination section 3 (projection lamp) which illuminates a document on the document table 1 and which arranges on the top behind side of document table 1, an operation section 4 which sets various image reading conditions, a mirror 5 disposed along the subscanning direction arranged at an edge within the reading range at the behind side of the document table 1, and a control section described later. In the reading section 2, the edge shape of a document imaged in the mirror 5 by the light emitted from the illumination section 3 which irradiates the document and the mirror 5, i.e., the image of the document viewed from a horizontal direction (hereinafter referred to as "mirror image 11"), is read to detect the height of the document surface, and the light reflected by the document is read as the document image.

Figure 2:
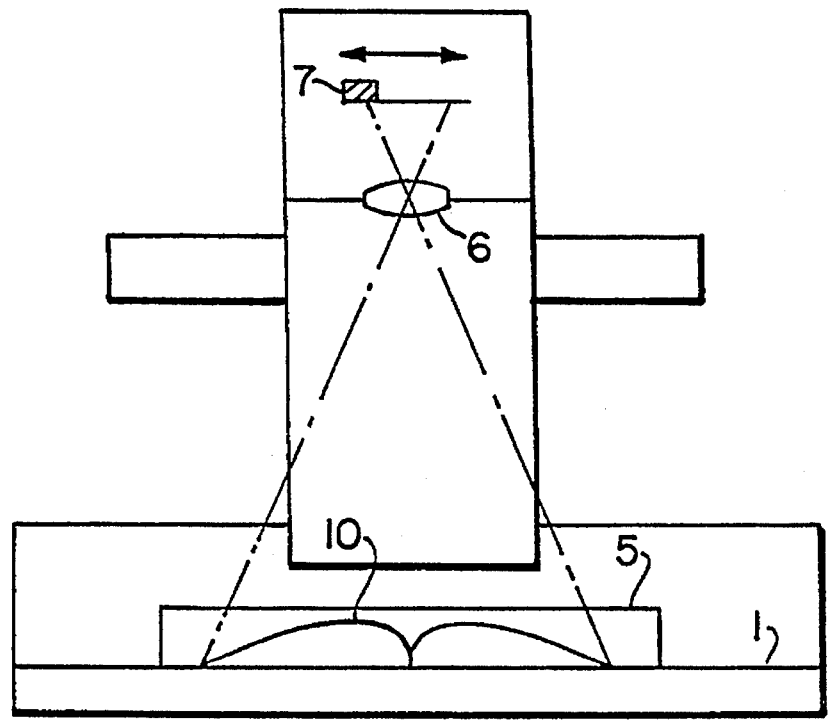
FIG. 2 is a brief section view (frontal) of the image reading apparatus of the present invention.
Figure 3:
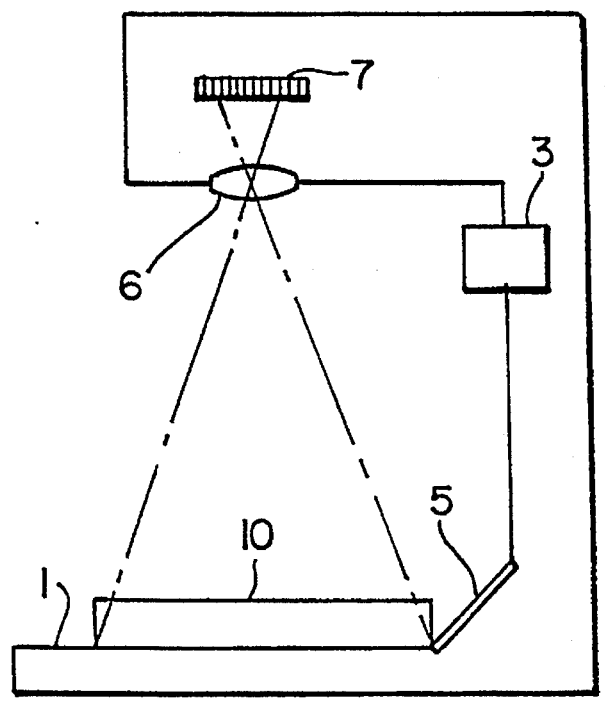
FIG. 3 is a brief section view (lateral) of the image reading apparatus of the present invention.

FIGS. 2 and 3 are section views of the aforesaid apparatus from the front and side, respectively. The reading section 2 is an optical system for forming a document image on an imaging element which accomplishes photoelectric conversion, and comprises a lens 6 which is only movable along the optical axis direction via a motor used for autofocusing, and a CCD line sensor 7 (hereinafter referred to as "CCD") as the imaging element movable in a subscanning direction (arrow direction in FIG. 2) in the focal plane wherein the document image is formed. The CCD 7 is provided above the lens 6, and has n individual picture elements arranged in the main scanning direction, such that when the CCD 7 reads a document via the lens 6, a portion of the CCD 7 reads the mirror image 11 which is the image of the edge shape of the document. Furthermore, the lens 6 is movable only along the optical axis direction, and the CCD 7 reads the document image by scanning in a subscanning direction (lateral direction), such that the CCD 7 reads the document from an inclined direction except when said CCD 7 reads the document through the lens 6 on the optical axis prolongation line of the lens 6.

The mirror 5 has a document positioning stopper extending in the subscanning direction at the interior side of the document table 1, and which is arranged at an inclination of 45° relative to the surface of the document table 1. The document 10 is positioned by contacting a top edge thereof to a bottom edge of the mirror 5, and positioning of document 10 is accomplished. Furthermore, the document table 1 is a color having a color density greater than the background density of document 10.

Figure 4:
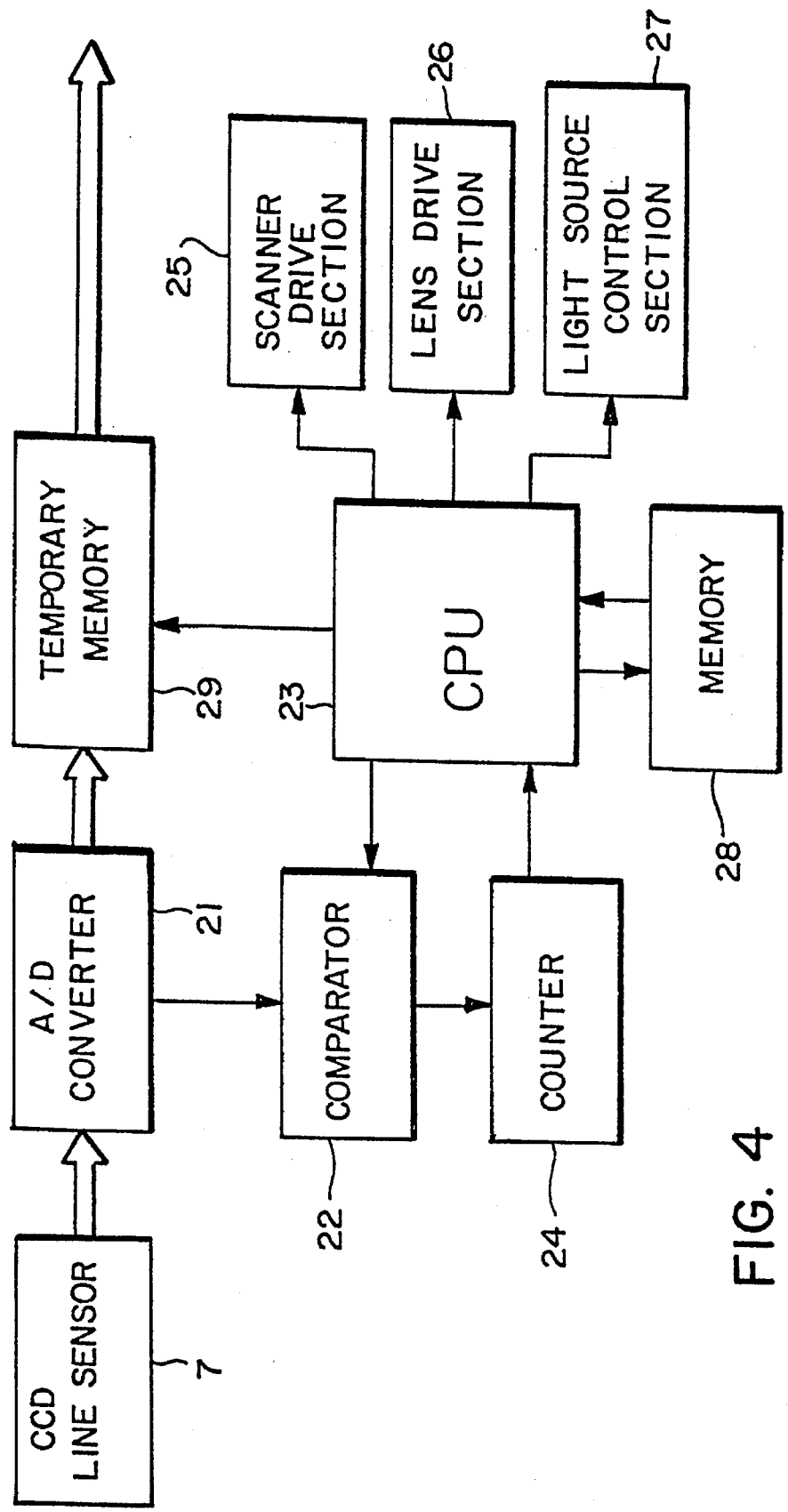
FIG. 4 is a control block diagram of the image reading apparatus of the present invention.

FIG. 4 shows the control block of the present apparatus. After an output of the CCD 7 is subjected to an analog-to-digital conversion by an A/D converter 21, the converted data are input to a comparator 22, and input to a temporary memory 29. A threshold value L1 is set beforehand in the comparator 22 via a CPU 23 (CPU: central processing unit), such that when an output intersecting the threshold value L1 is input to the comparator 22, a counter 24 is set. The CPU 23 stores the minimum and maximum count values of the counter 24. The CPU 23 determines the document height and a dimension in the subscanning direction based on the output of the counter 24. Based on the aforesaid input, the CPU 23 outputs instructions to a scanner drive section 25 to move the CCD 7 in the subscanning direction, outputs instructions to a lens drive section 26 to move the lens 6 along the optical axis to focus the document image on the CCD 7, and outputs instructions to a light source control section 27 to control the light emission of the illumination section 3.

Figure 5:
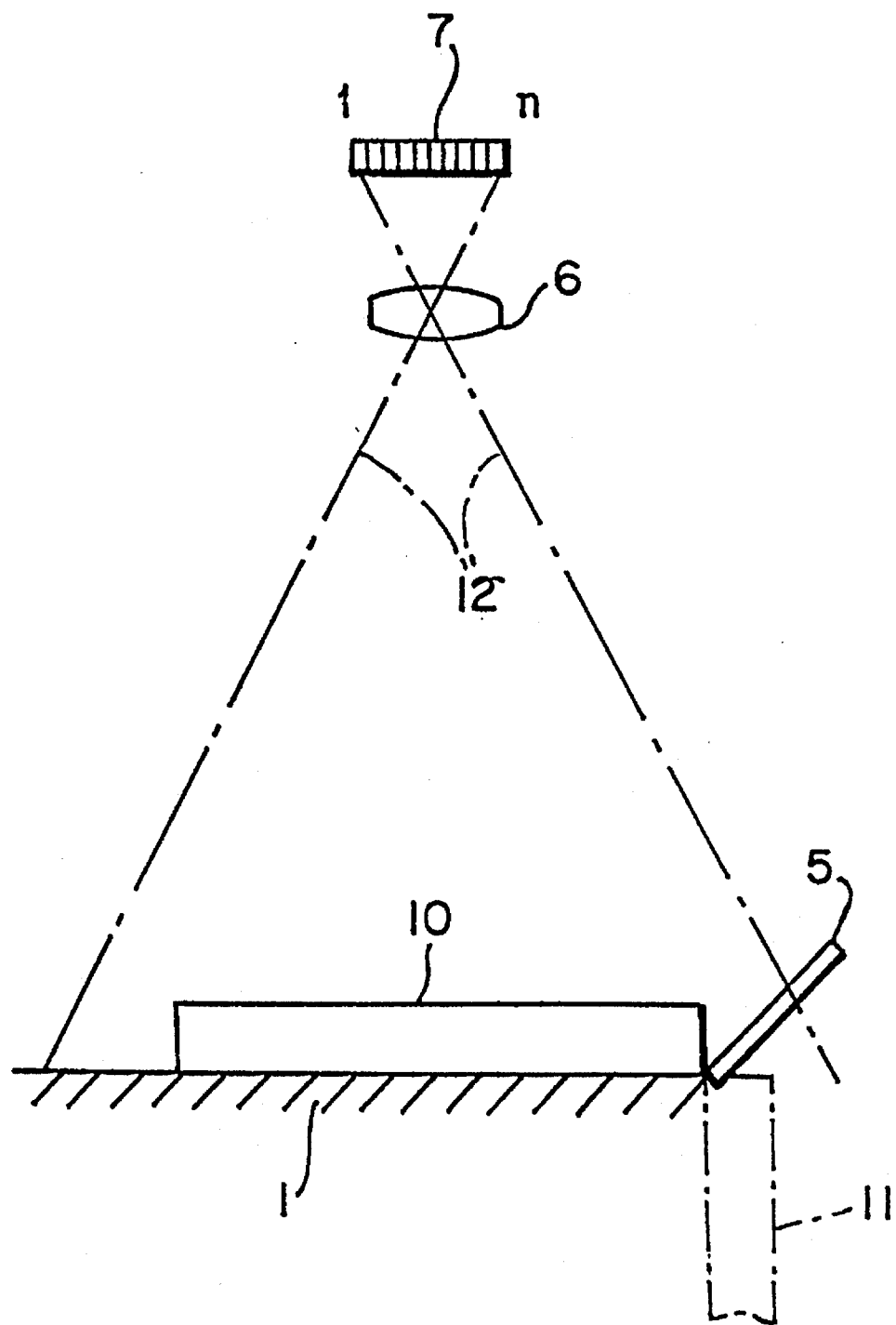
FIG. 5 is an illustration showing the principle of height detection of the image reading apparatus of the present invention.

FIG. 5 illustrates the principle of detecting the height of the document so as to accomplish focusing. The document 10 is placed face up on the document table 1 so as to contact at the bottom edge of mirror 5, such that the top edge shape of the document 10 is imaged in mirror 5, and thus the mirror image 11 is formed on the prolongation line of the image of the document 10. The reading range of the CCD 7 is represented by the dashed line 12 in the drawing, and the CCD 7 picture elements are represented by 1n sequentially from the edge thereof.

Figure 6:
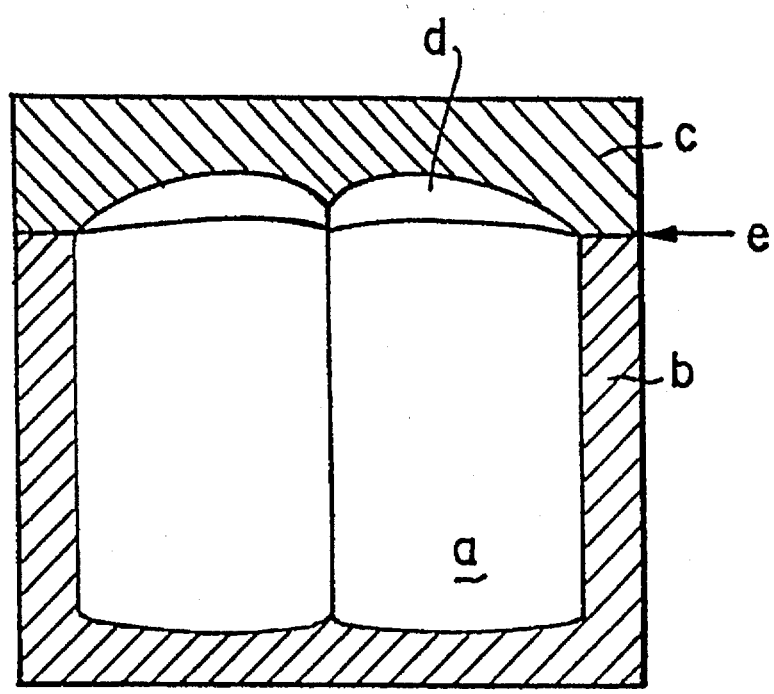
FIG. 6 is an illustration showing the read image data.

In FIG. 6 shows the image data read by a plurality of picture elements of CCD 7 moving in the main scanning and subscanning direction. In the drawing, "a" represents the document 10, "b" represents the document table 1, "c" represents the mirror 5, "d" represents the area of the mirror image 11, and "e" represents the reference position of the document 10 at the bottom edge of the mirror 5. The mirror image 11 is read by the change in the height of the document surface, such that the high portion is at the top of the drawing and somewhat distorted. The document and its edge surface are illuminated by the illumination section 3 such that the entirety is read as white. On the other hand, the document table 1 read as black due to its color which is of greater density than the document surface. Furthermore, the area wherein mirror image 11 is not reflected in the mirror 5 is imaged as empty at the front of the apparatus in accordance with the operation space, and is read as black due to the slight amount of the incident light.

The mirror 5 does not have a function to simply produce the mirror image 11, but also functions to illuminate the edge surface of the document 10 with the light emitted form the illumination section 3. The angle of the mirror 5 is determined so as to accurately detect the height of documents, and even a document wherein the paper has yellowed the course of several years.

Figure 7:
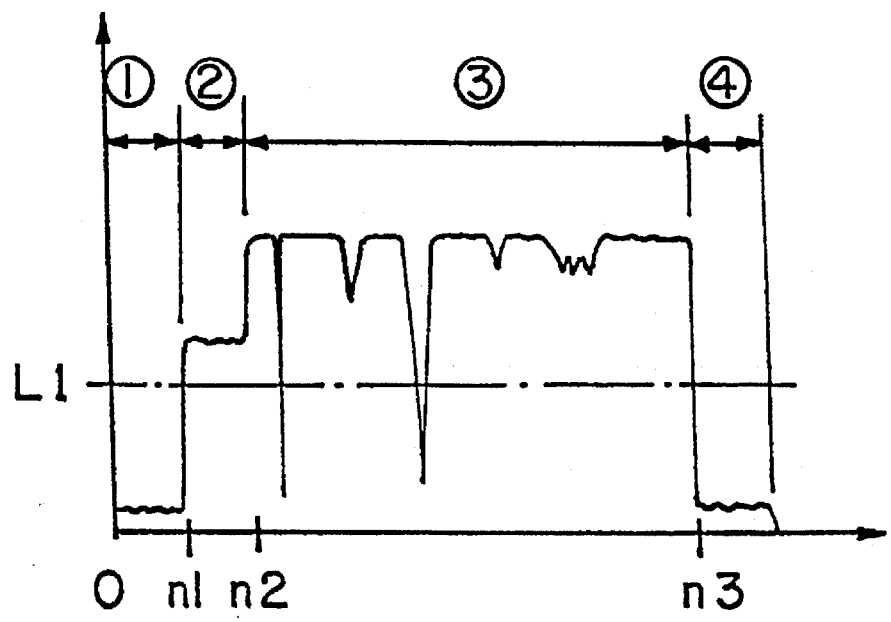
FIG. 7 shows an example of one-line output of the CCD.
Figure 8A:
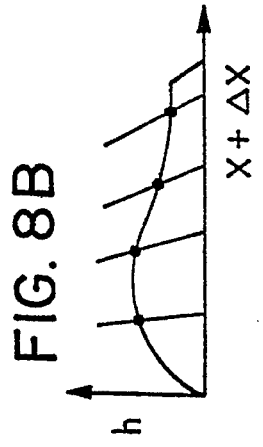
FIGS. 8A, 8B, 8C and 8D show the relationship between the document reading position of the CCD and the actual document height at the reading position.
Figure 8B:
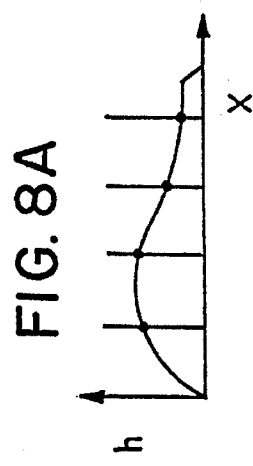
Figure 8D:
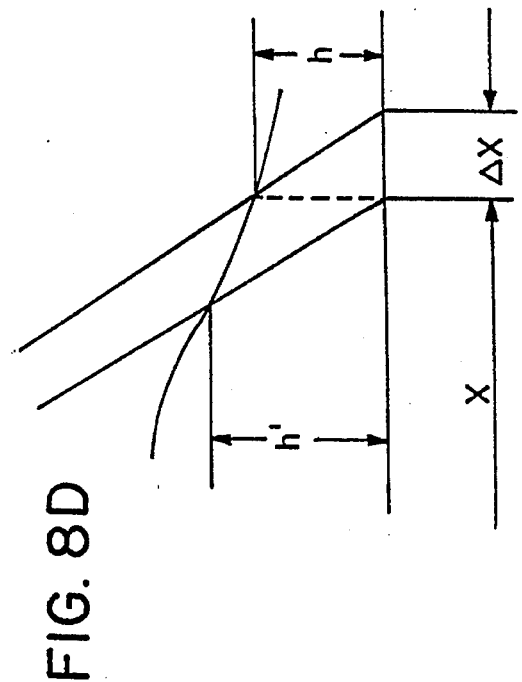
Figure 8C:
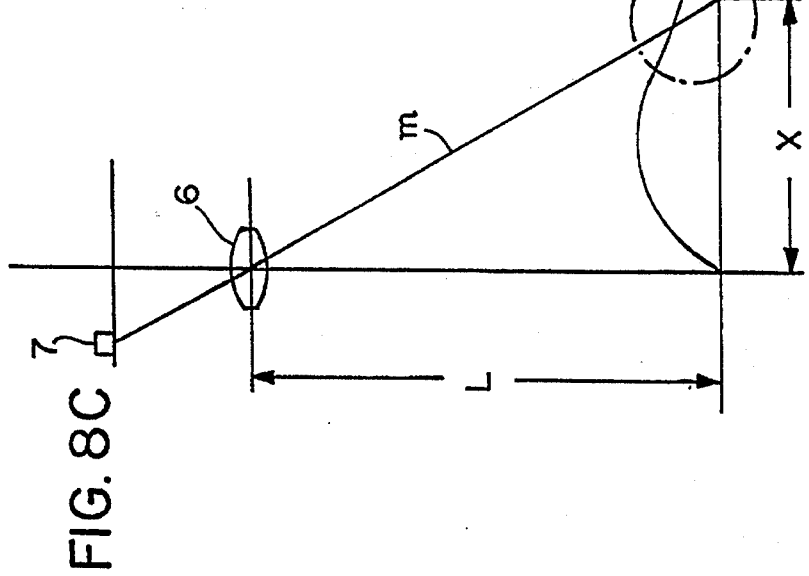

FIG. 7 shows an example of a one-line output of the CCD 7 in the main scanning direction. In the drawing, a horizontal axis represents the number of picture elements of the CCD 7 (left: back side; right: front side), a vertical axis represents a degrees of the illumination of the sensor surface, (1)

represents the region "c" wherein the mirror image 11 is not imaged on the mirror 5, (2) represents the region "d" of the mirror image 11 on the mirror 5, (3) represents the region "a" of the document 10, and (4) represents the region "b" of the document table 1. L1 is the threshold value for discriminating the document 10 and the mirror image 11 from other regions, n1 is a minimum value of picture elements intersecting threshold value L1, n3 is a maximum value of picture elements intersecting threshold value L1, and n2 is a picture element (stationary) corresponding to document reference position "e". (n2−n1) is the number of picture elements corresponding to the height of the document, and (n3−n2−α) is the number of picture elements corresponding to the dimension of the document in the vertical (front-to-back) direction. The aforesaid value α is the curved portion at the bottom edge of the document coincident with the change in the height of the document, and is determined by the document height (n2−n1). When the CCD 7 moves in a subscanning direction, the value of n1 corresponding to the mirror image 11 changes, such that the distribution of the height of the document in the subscanning direction can be determined.

FIG. 8 shows the relationship between the document reading position of the CCD 7 and the actual document height at the reading position. The document reading position x is the position at which the prolongation line of the optical path m connecting the CCD 7 and the principal point of the lens 6 intersects the document table 1, and the reading position x is readily determined from the position of the CCD 7. The document height at reading position x is such that a document height h is detected at a position of the intersection between the document surface and a perpendicular line of the document table 1 passing through said position x. However, when the optical path m for reading is inclined (because the CCD 7 is moved at the off-axial position of the lens 6), the reading position relative to the document of said height is moved laterally in the drawing. That is, rather than the document height h corresponding to reading position x, the document height h' corresponding to the position of the intersection between the document and the optical path m must be used. Conversely, when considering the measured document height data as standard, height data h must not be used as the height data at the position x, but rather as the height data at the position x+Δx. The aforesaid value Δx is determined by the equation wherein the distance between the lens 6 and the document table 1 is defined as L.

$$\Delta x = x*h/(L-h) \tag{1}$$

Accordingly, height data h corresponds to the reading position x+Δx via correction of the aforesaid Δx.

Figure 9B:
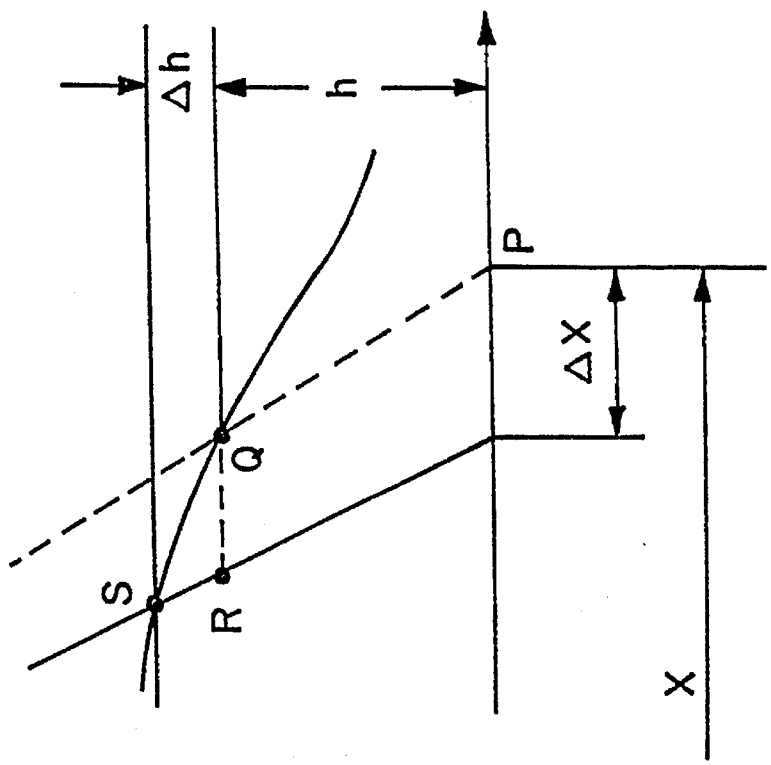
FIGS. 9A and 9B show the movement of the reading position in accordance with the change of the reading optical path coincident with lens movement.
Figure 9A:
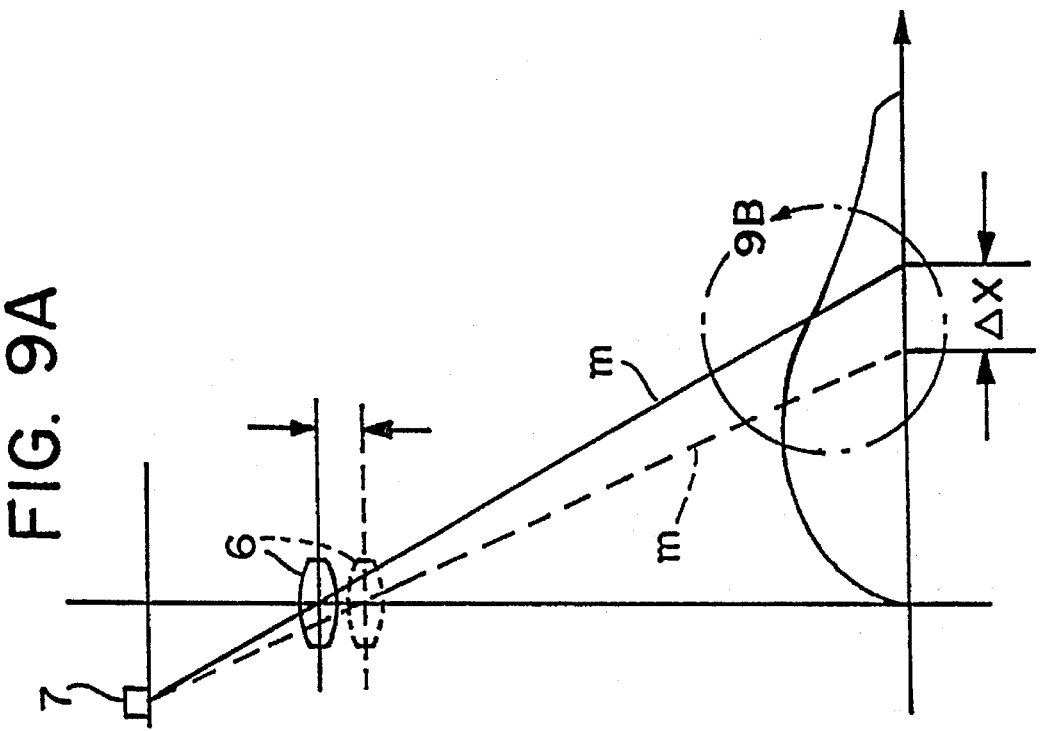

FIGS. 9A and 9B show the movement of the reading position in accordance with the change of the reading optical path coincident with lens movement in the optical axis of the lens 6. Use of a single principal point lens to form a document image in the present apparatus requires that the lens body be moved in the optical axis of the lens to achieve focus. Furthermore, the reading optical path m is changed to the optical path m' due to the movement of the principal point of the lens 6 and the movement of the lens 6 in accordance with the change in the document height. Accordingly, the reading position is moved in the subscanning direction, such that the height data determined previously for the reading position is different than the height when the document is actually read.

In FIG. 9B, the document height at the reading position of point P is designated h; when the lens 6 is moved to focus at point Q corresponding to the document at said point P, the reading position is moved Δx, such that reading actually occurs at point S. Because the composite focal position is point R, a positional dislocation of Δx and focal point dislocation of Δh arises in accordance with the movement of the lens 6. Accordingly, to correct the aforesaid dislocations a position (x+β) relative to the reading position x may be converted using β defined in the following equation.

$$\beta = c*h*x \tag{2}$$

Wherein c is a constant determined by the optical system.

Figure 10B:
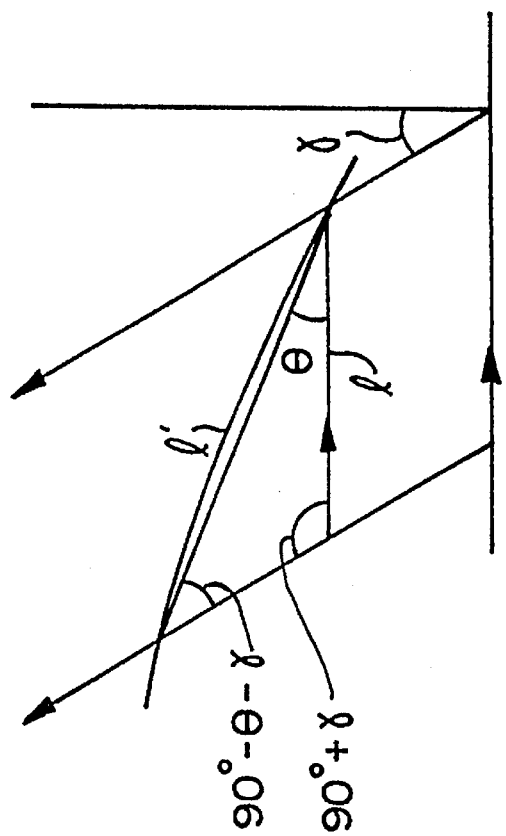
FIGS. 10A and 10B show the compression due to inclination of the document.
Figure 10A:
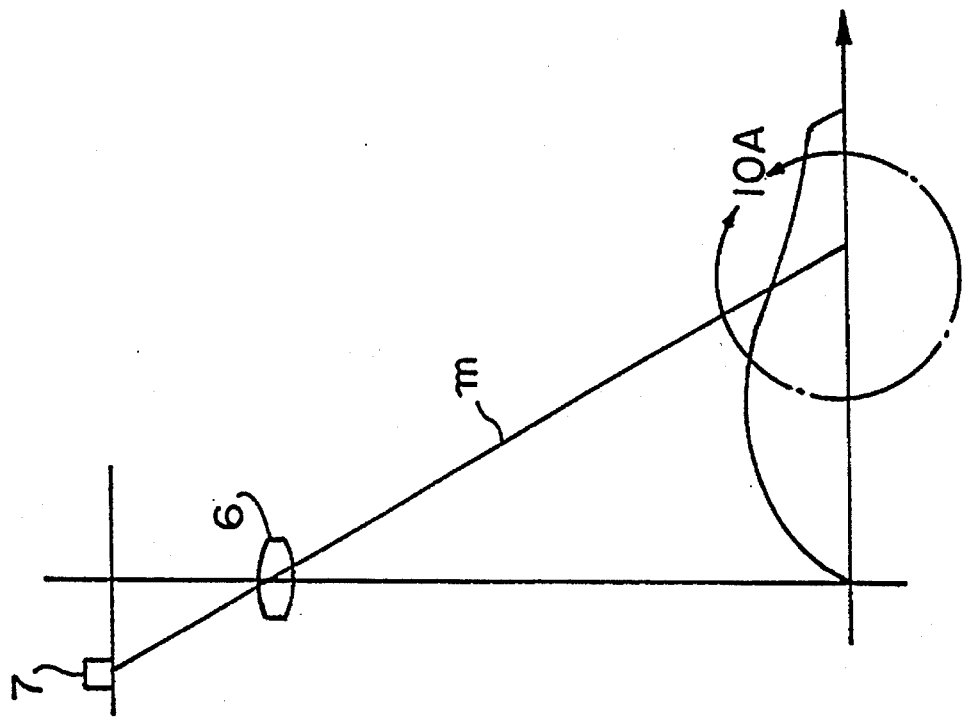

FIGS. 10A and 10B show the compression in the subscanning direction due to the inclination of the document 10. In the apparatus of the present embodiment, the lens 6 is movable only relative to the direction of the optical axis, such that in order to read an image in the subscanning direction, the CCD 7 reads the document from an inclined direction except when reading the document through the lens 6 on the prolongation line of the lens optical axis. In this state, the compression caused by the inclination of optical path m must be corrected in addition to the compression of the image produced by the inclination of the document 10.

At first, in the vicinity of the optical axis of the lens 6, the actual document length l' can be determined by the equation below when the document inclination angle is θ, the slight curvature of the document surface is ignored, and a near right triangle is formed.

$$l' = l/\cos \theta \tag{3}$$

On the other hand, at a position separated from the optical axis, the compression is generated by the inclination of optical path m, such that the actual document length l' can be determined by the following equation using the sine theorem.

$$l'/\sin(90°+\gamma) = l/\sin(90°-\theta-\gamma)$$

And therefrom derive the following.

$$l' = l* \sin(90°+\gamma)/\sin(90°-\theta-\gamma) = l*\cos\gamma/\cos(\theta+\gamma) \tag{4}$$

Figure 11:
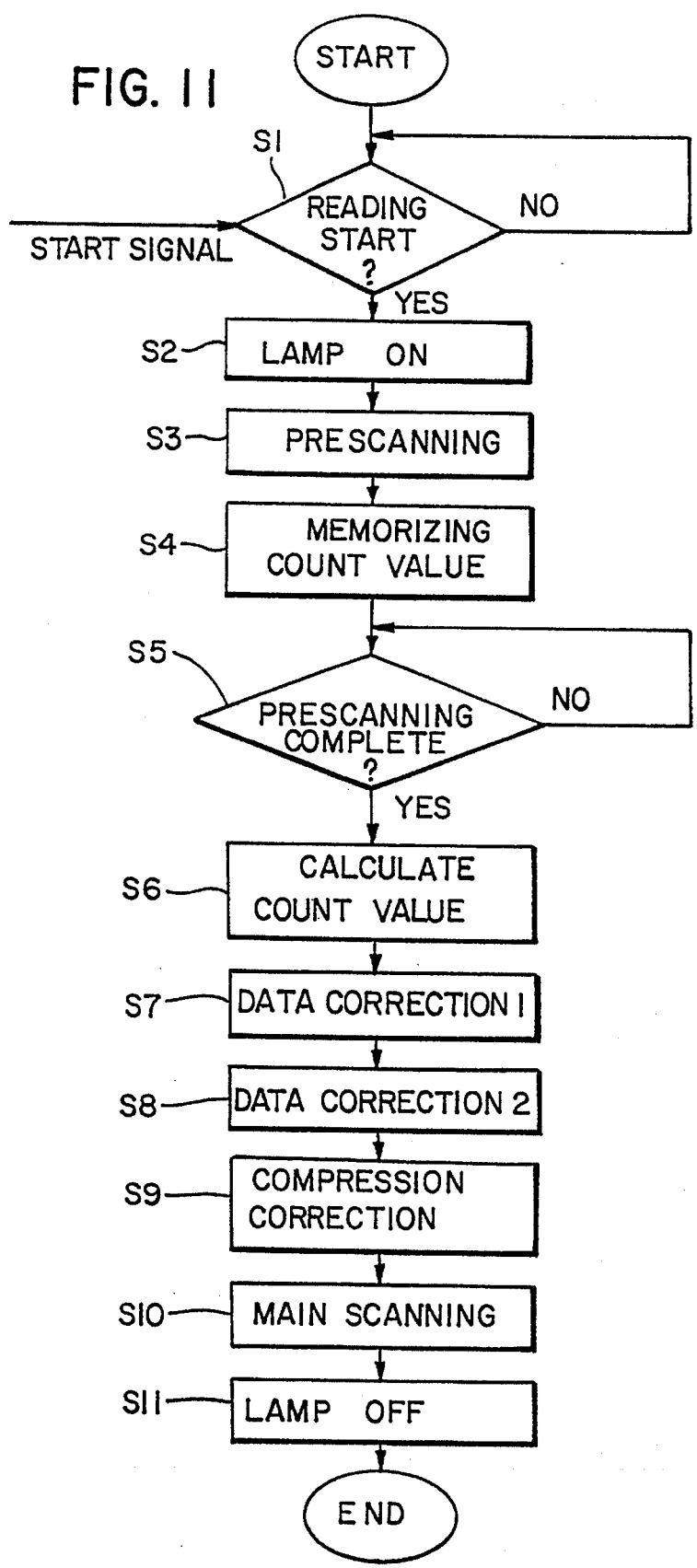
FIG. 11 is a flow chart showing the reading operation.

FIG. 11 is a flow chart showing the image reading operation. When a reading operation start signal is input in step S1, the CPU 23 transmits instructions to the light source control section 27 to illuminate the lamp of the illumination section 3 (step S2). Then, in step S3, prescanning is started, and the height of the document is detected based on the mirror image 11. At this time, the CCD 7 moves at one edge to read mirror image 11, the output of the CCD 7 is subjected to the analog-to-digital conversion by the A/D converter 21, and thereafter said read data are input to the comparator 22. As previously described, an illumination threshold value L1 is set beforehand in the comparator 22 by the CPU 23, and when the input data intersected said threshold value L1 in the comparator 22, the counter 24 is set, and the minimum and maximum count values of the counter 24 are stored in the memory 28 in the CPU 23 (step S4). Until the prescanning is completed (step S5), the aforesaid operation is repeated at uniform intervals to obtain the height data distribution in the subscanning direction of the document (step S6). After prescanning is completed, first data correction along the reading optical path (correction of the reading position determined considering the inclination of the reading optical path) or/and second data correction of the lens movement (correction of the reading position determined considering the movement of the reading position in accordance with the changes in the reading optical path via the movement of the lens) are accomplished in accordance with the previously mentioned equations (1) and (2) based on the height data distribution obtained in the calculation of count values (steps S7 and S8).

In step S9, the height distribution is determined for each uniform interval in the subscanning direction based on the obtained document height data, the magnification correction percentage of the document is determined for each section using equations (3) and (4), and the compression correction is calculated. The calculations are repeated for the number of lines of each section via the magnification correction rate, and allocated equally within the section.

When the aforesaid correction and calculation is completed, the scanning is started by the CCD 7 in a direction opposite to that of the prescanning, such that the document is read in a main scanning (step S10). At this time, the lens drive section 26 is controlled to accomplish focusing based on the height data corrected in the aforesaid calculations, and the image data subjected to the A/D conversion is stored in the temporary memory 29 in units of one-line of the main scanning. The writing address is controlled by the CPU 23, such that the transmitted image data are sequential picture elements numbers in the main scanning direction and are written to the temporary memory 29. When the writing of one-line segments of the image data is completed, the next line of image data is written to the temporary memory 29 in the same manner as the previous line. At this time, image data previously written to the temporary memory 29 (the previous line's image data) are sequentially read from the temporary memory 29 in parallel with the reading operation of the next line. The readout address is controlled by the CPU 23 in the same manner as the writing method, and are read out from the temporary memory 29 in the picture element number sequence in the main scanning direction. The image data in the subscanning direction also is readout sequentially in line units in the same manner as when writing, but when said readout attains a location with corrected the image compression, the CPU 23 prevents advance of addresses in the line direction, and reads out once again the image data of the line read immediately previously. The image data magnification correction in the subscanning direction is accomplished by the aforesaid operation. Finally, the illumination section 3 is extinguished (step S11), and the image reading operation ends.

Although, in the present embodiment, the image data are repeatedly written and read as a correction means for magnificating the compression of the read image of the document based on the results of first data correction along the reading optical path or/and second data correction of the lens movement, it is to be understood that correcting compression of the read image by sequentially modifying scanning speed, or correcting compression of the read image by sequentially modifying the sampling interval of the read data while maintaining constant scanning speed are also possible.

Furthermore, in the present embodiment, the edge surface of the document is imaged in the mirror 5 disposed at an inclination angle of 45° relative to the document table 1 so as to read said edge surface by the CCD 7 as a means for detecting the height of the document, but the document height may also be detect from the shape (silhouette) of the document reflected in the stopper wherein the document contacting surface of the stopper is a reflective surface disposed perpendicular relative to the document table 1. In addition, a light beam may irradiate the surface of the document from an inclination such that the height is detected via the curvature.

The present invention is not limited to the previously described embodiment inasmuch as various modifications are possible. For example, although focusing was accomplished only via lens movement using a single focal point lens in the present embodiment, a zoom lens may alternatively be used so as to correct magnification in the main scanning direction simultaneously with focusing. Furthermore, although reading position was corrected in equations (1) and (2), it is to be understood that the document height may be corrected instead of correcting said reading position.

What is claimed is:

1. An image reading apparatus for reading an open book document placed face up on a document table by optical scanning comprising:

a mirror arranged along a lateral side of the document table in a subscanning direction and which reflects a lateral side view of the book document placed on the document table;

a projection lens disposed above the document table and which projects an image of the book document placed on the document table and the lateral side view of the book document reflected on the mirror;

a scanner disposed above the projection lens which includes a line sensor arranged along a main scanning direction and sequentially moves a reading position of the line sensor in the subscanning direction, wherein the line sensor captures an image of the book document projected by the projection lens and the lateral side view of the book document reflected on the mirror to generate image signals at every reading position;

detection means for detecting a height of the book document placed on the document table at every reading position based on the image signal of the lateral side view of the book document; and correction means for correcting the detected height of the book document at every reading position based on a deviation between a position of the image of the book document projected on the line sensor and a position of the lateral side view of the book document projected on the line sensor with respect to the subscanning direction.

2. The image reading apparatus as claimed in claim 1, wherein said mirror is arranged at an inclination to the surface of the document table, and determines a setting position of the document by having contact with an edge of the document.

3. The image reading apparatus as claimed in claim 1, further comprising:

a lens driver which controls an amount of the movement of the projection lens along the direction of an optical axis in order to project an image of the book document on the line sensor.

4. The image reading apparatus as claimed in claim 1, further comprising;

control means which magnifies a document image compression generated from a inclination of the book document in the subscanning direction based on the height of the book document corrected by correction means.

5. The image reading apparatus as claimed in claim 4, wherein the document image compression generated from the inclination of the book document is magnified by modifying the scanning speed.

6. An image reading apparatus for reading an open book document placed face up on a document table by optical scanning comprising:

a mirror arranged along a lateral side of the document table in a subscanning direction and which reflects a lateral side view of the book document placed on the document table;

a projection lens disposed above the document table and which projects an image of the book document placed on the document table and the lateral side view of the book document reflected on the mirror, wherein said projection lens is movable only along the direction of an optical axis thereof;

a scanner disposed above the projection lens which includes a line sensor arranged along a main scanning direction and sequentially moves a reading position of the line sensor in the subscanning direction, wherein the line sensor captures an image of the book document projected by the projection lens and the lateral side view of the book document reflected on the mirror to generate image signal at every reading position;

detection means for detecting a height of the book document placed on the document table at every reading position based on the image signal of the lateral side view of the book document; and correction means for correcting the detected height of the book document at every reading position based on a deviation between a position of the image of the book document projected on the line sensor and a position of the lateral side view of the book document projected on the line sensor with respect to the subscanning direction, wherein said deviation is generated from the movement of the projection lens in the direction of the optical axis thereof.

7. The image reading apparatus as claimed in claim 6, wherein said mirror is arranged at an inclination to the surface of the document table, and determines a setting position of the document by having contact an edge of the document.

8. The image reading apparatus as claimed in claim 6, further comprising;

a lens driver which controls an amount of the movement of the projection lens along the direction of the optical axis in order to project the document image on the line sensor.

9. The image reading apparatus as claimed in claim 6, further comprising;

control means which magnifies a document image compression generated from a inclination of the book document in the subscanning direction based on the height of the book document corrected by the correction means.

10. The image reading apparatus as claimed in claim 6, wherein the document image compression generated from the inclination of the book document is magnified by modifying the scanning speed.

11. An image reading apparatus for reading a book document placed face up on a document table by optical scanning comprising:

a mirror arranged along a lateral side of the document table in a subscanning direction and which reflects a lateral side view of the book document placed on the document table;

a projection lens disposed above the document table and which projects an image of the book document placed on the document table and the lateral side view of the book document reflected on the mirror;

a line sensor arranged above the projection lens and along a main scanning direction and sequentially moves in the subscanning direction, wherein the line sensor captures an image of the book document projected by the projection lens and the lateral side view of the book document reflected on the mirror to generate an image signal;

detection means for detecting a height of the book document placed on the document table based on the image signal of the lateral side view of an book document; and correction means for correcting the detected height of the book document at a reading position based on a deviation between a position of the image of the book document projected on the line sensor and the lateral side view of the book document projected on the line sensor with respect to the subscanning direction, wherein said reading position is the position at which the prolongation line of the optical path connecting the line sensor and a principal point of the lens intersects the document table.

12. The image reading apparatus as claimed in claim 11, wherein the height of the book document detected by the detection means is equal to the height of the position of an intersection between a document surface and a perpendicular line of the document table passing through the reading position.

13. The image reading apparatus as claimed in claim 11, wherein the height of the book document corrected by the correction means is equal to the height of the position at the intersection between the document surface and the optical path.

14. An image reading apparatus for reading an open book document placed face up on a document table by scanning comprising:

means for providing an image of a lateral side view of the book document;

a projection lens disposed above the document table and which projects an image of the book document placed on the document table and a lateral side view of the book document;

a scanner disposed above the projection lens which includes an image sensor, wherein the image sensor captures an image of the book document and the lateral side view of the book document projected by the projection lens to generate an image signal at every reading position;

means for moving the scanner to enable the generation of the image signal;

detection means for detecting a height of the book document placed on the document table at every reading position based on the image signal of the lateral side view of the book document; and correction means for correcting the detected height of the book document at every reading position based on a deviation between a position of the image of the book document and a position of the lateral side view of the book document.

15. The image reading apparatus of claim 14 wherein the correction means further includes a CPU and means for determining an angle of inclination of the book document to the optical path based on a change in a document reading angle as the scanner is moved; the CPU computing a correction in the detected height based on the determined angle of inclination.

16. The image reading apparatus of claim 15 further including means for correcting any compression of the image signal by storing the image signals of a scan line and using them in a subsequent scan line generation of image signals.

* * * * *